United States Patent [19]

Jo

[11] Patent Number: 5,604,647
[45] Date of Patent: Feb. 18, 1997

[54] METHOD FOR CHECKING ABNORMAL OPERATIONS OF VIDEO CASSETTE RECORDER

[75] Inventor: Seong W. Jo, Seoul, Rep. of Korea

[73] Assignee: SamSung Electronics Co., Ltd., Kyungki-do, Rep. of Korea

[21] Appl. No.: 726,879

[22] Filed: Jul. 8, 1991

[30]     Foreign Application Priority Data

Sep. 29, 1990  [KR]    Rep. of Korea ..................... 90-15854

[51] Int. Cl.$^6$ ................................................. G11B 15/22
[52] U.S. Cl. ............................................. 360/69; 360/137
[58] Field of Search .......................... 360/69, 75, 77.13, 360/71, 137; 371/16.4, 15.1

[56]                 References Cited

U.S. PATENT DOCUMENTS 4,553,182  11/1985  Narita ...................................... 360/96.1
4,639,918   1/1987  Linkowski .............................. 371/16.4
5,055,960  10/1991  Pepsnik ..................................... 360/132

Primary Examiner—Aristotelis Psitos
Assistant Examiner—Ames T. Wilson
Attorney, Agent, or Firm—Robert E. Bushnell, Esq.

[57]                 ABSTRACT

The present invention relates to a video cassette recorder (VCR). The present invention decides the mode conversion of the VCR by checking the mode switch signal and displays the mode error data in the abnormal mode conversion, Also, the present invention decides the operation state corresponding to each mode by using the reel pulse and drum pulse and displays the error data if in an abnormal state, thereby informing the users whether the VCR is normal or not.

21 Claims, 6 Drawing Sheets

METHOD FOR CHECKING ABNORMAL OPERATIONS OF VIDEO CASSETTE RECORDER

BACKGROUND OF THE INVENTION

The present invention relates to a video cassette recorder (VCR) and more particularly to a method for checking abnormal operations of VCR which can check and display automatically the kind of abnormality when the operations of VCR deck is abnormal.

In the conventional VCR of FIG. 1, when the operations of deck is abnormal, many troubles may occur and normal operations are impossible. Moreover, since there is no way to inform users of the abnormal state of the deck, the users operate the VCR in that state.

SUMMARY OF THE INVENTION

The object of the present invention is to provide a method for checking and displaying automatically the abnormality of a deck using mode switch pulse, reel pulse, and drum pulse when the operations of the deck is abnormal.

According to the present invention, there is provided a method for checking the abnormality of the VCR, including a VCR drive circuit composed of a microprocessor for providing control signals, a deck part for providing a reel pulse, a drum pulse, and a mode switch pulse according to operation mode, and a digitron for displaying informations according to the control of said microprocessor, comprising:

a mode decision process for deciding whether a microprocessor is in auto-check mode, a stop mode decision process for deciding whether a deck part is normally operated according to a stop mode by checking a mode switch pulse and a drum pulse, a fast forward mode decision process for deciding whether said deck part is normally operated according to a fast forward mode by checking a mode switch signal and a reel pulse, a fast rewind mode decision process for deciding whether said deck part is normally operated according to a fast rewind mode by checking a mode switch signal and a reel pulse, a play mode decision process for deciding whether said deck part is normally operated according to a play mode by checking a mode switch signal, a reel pulse, and a drum pulse, a search mode decision process for deciding whether said deck part is normally operated according to a play mode, forward play search mode 10X rewind play search mode by checking a mode switch signal, a reel pulse, and a drum pulse, and an eject mode decision process for deciding whether said deck part is normally operated according to an eject mode by checking a mode switch signal.

DETAILED DESCRIPTION OF THE INVENTION

The present invention will now be described in more detail with reference to accompanying drawings.

Figure 3:
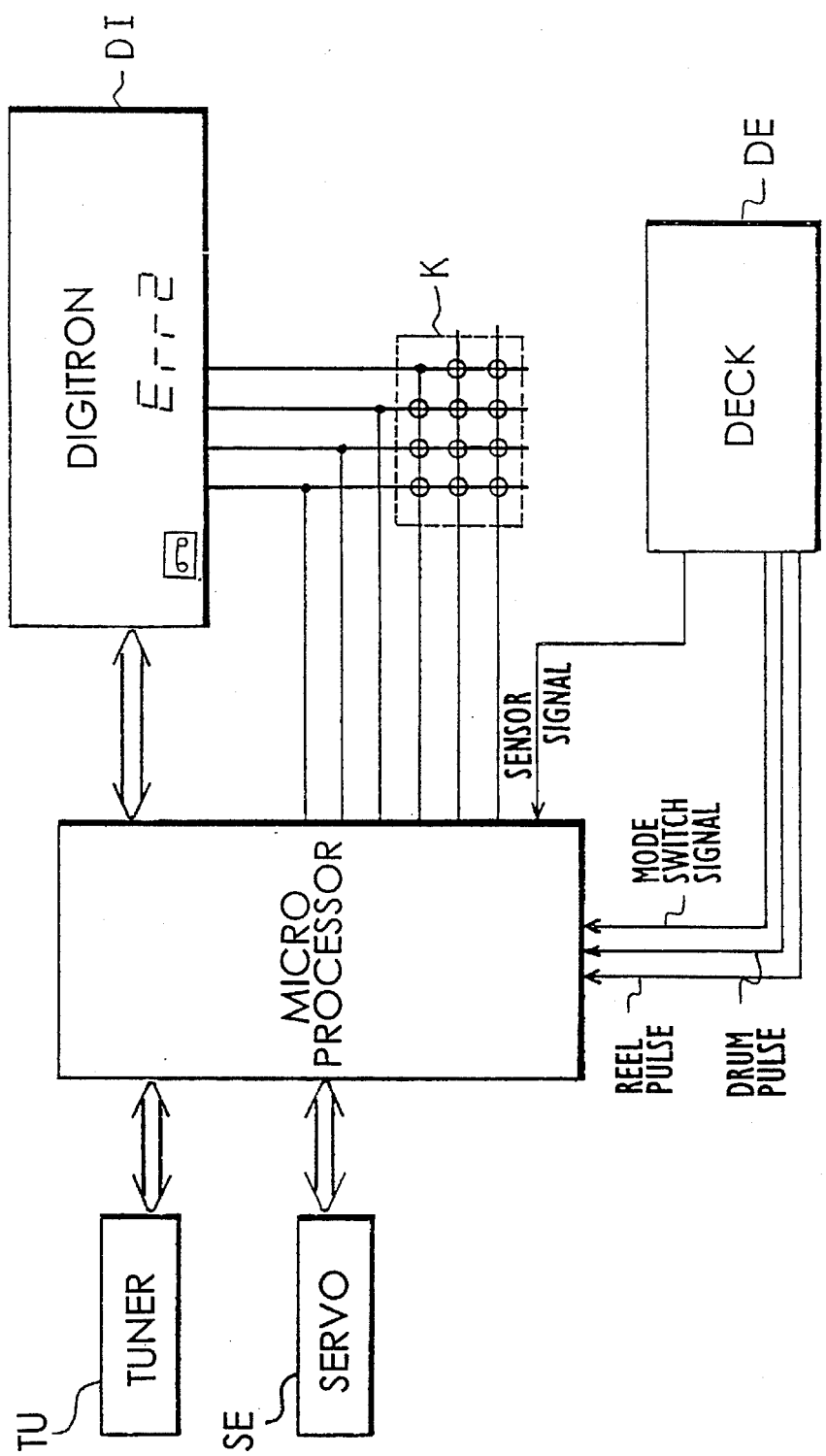
FIG. 3 is a block diagram of a control circuit for a VCR according to the invention.

FIG. 3 is a block diagram of a VCR control circuit to carry out a program for checking abnormal operations of a VCR.

Figure 1:
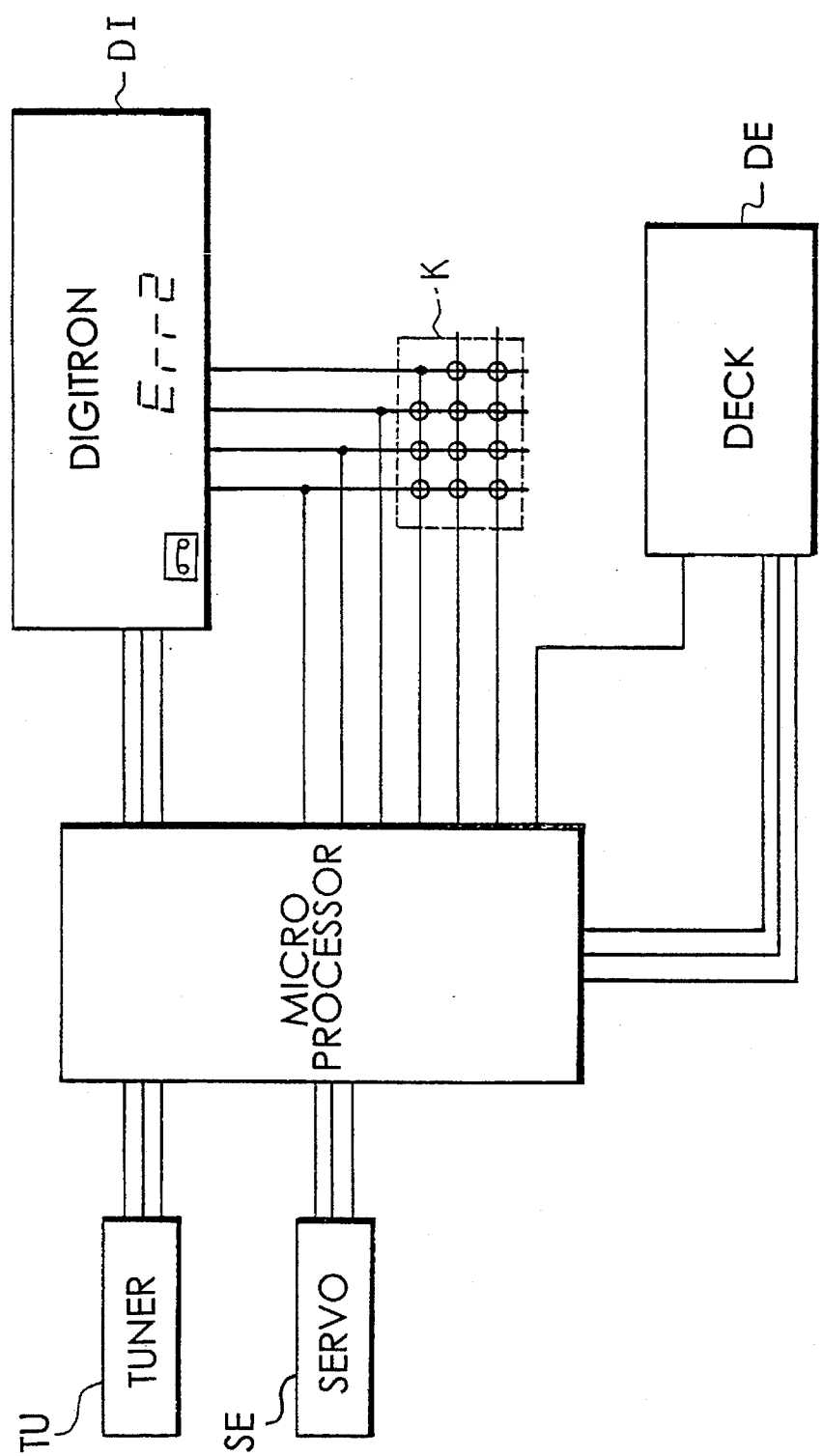
FIG. 1 is a block diagram of a control circuit for a conventional VCR.
Figure 2A:
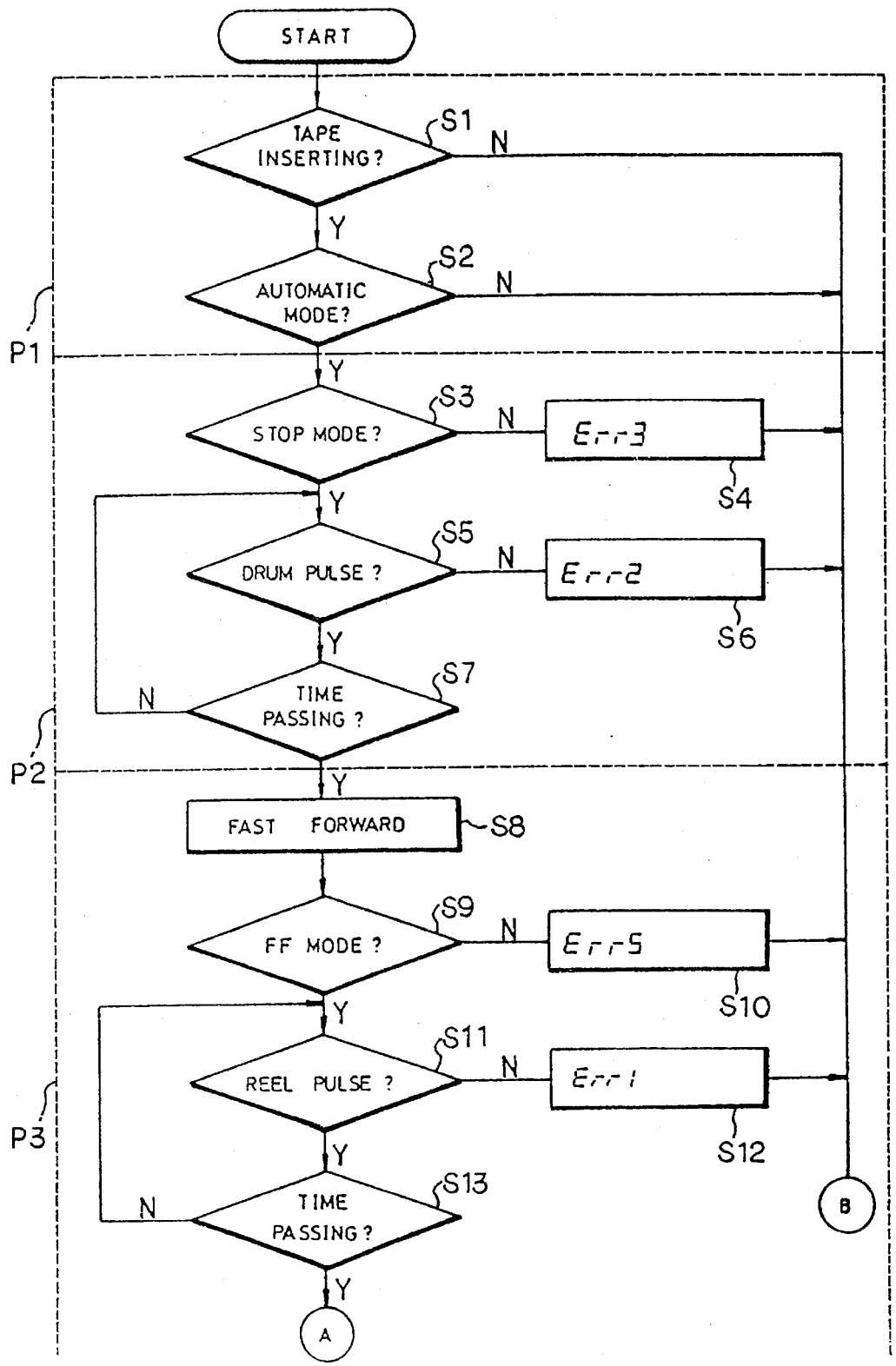
FIGS. 2(A)–2(D) are flow charts depicting a method for checking abnormal operations of VCR according to the present invention.
Figure 2B:
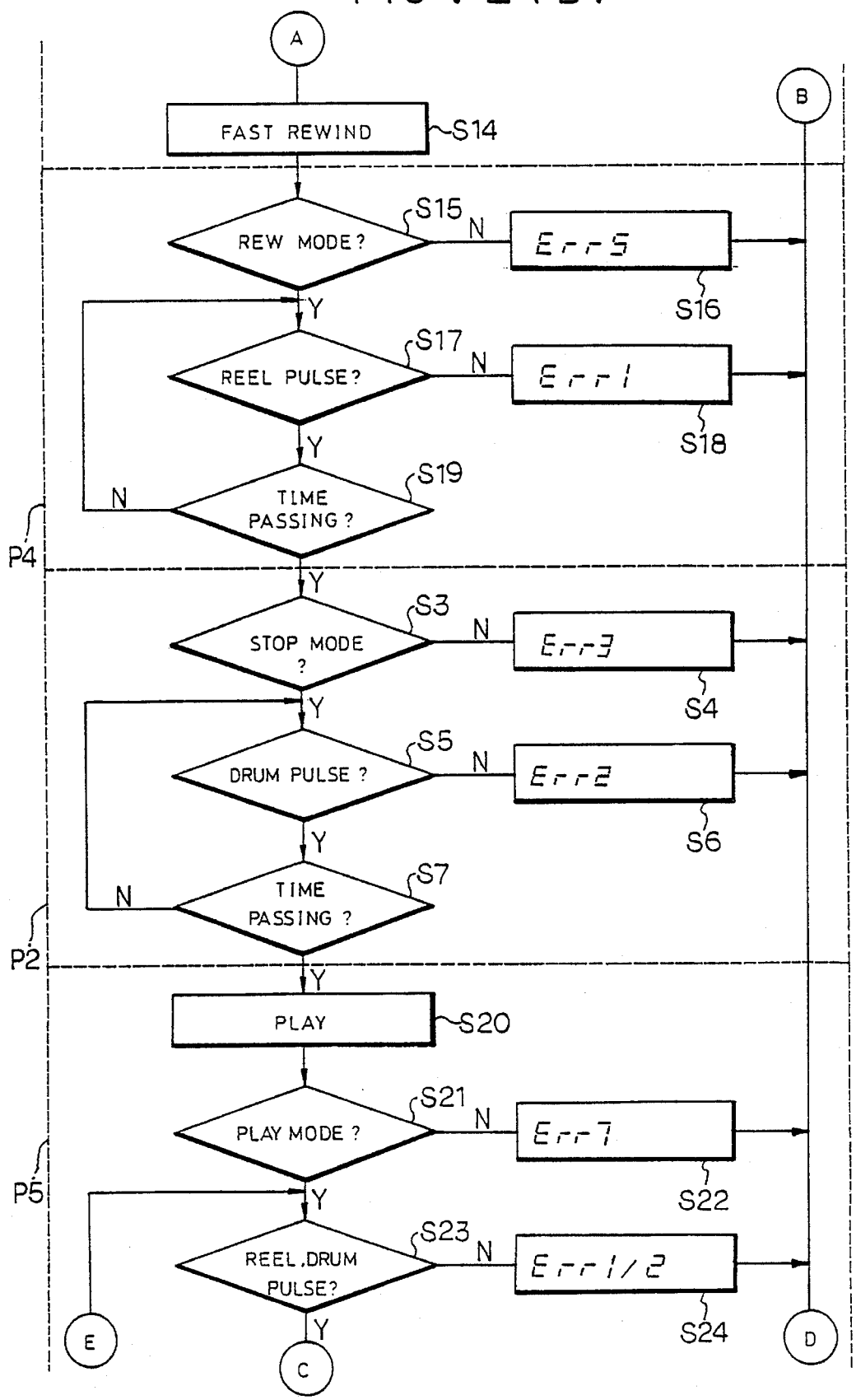
Figure 2C:
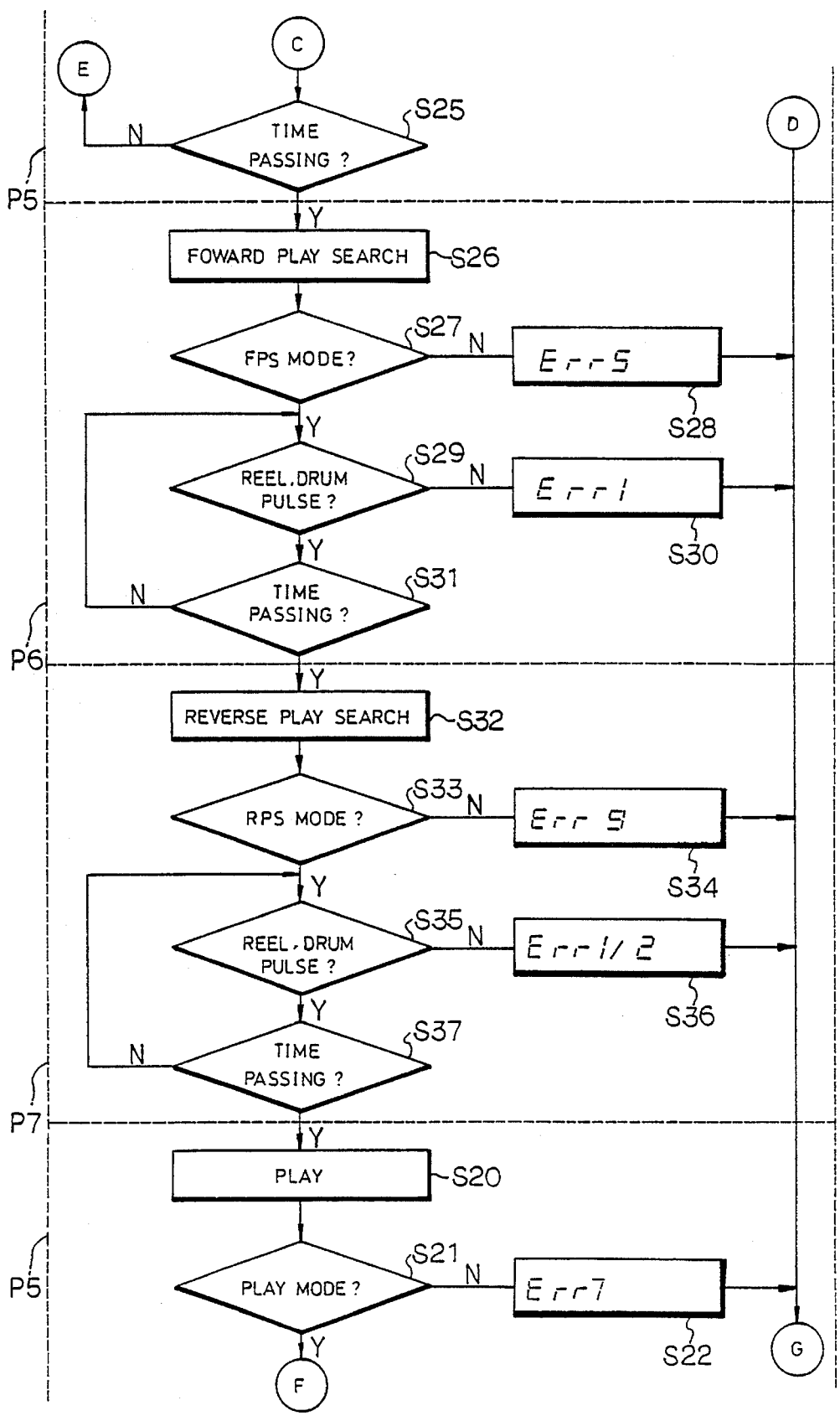
Figure 2D:
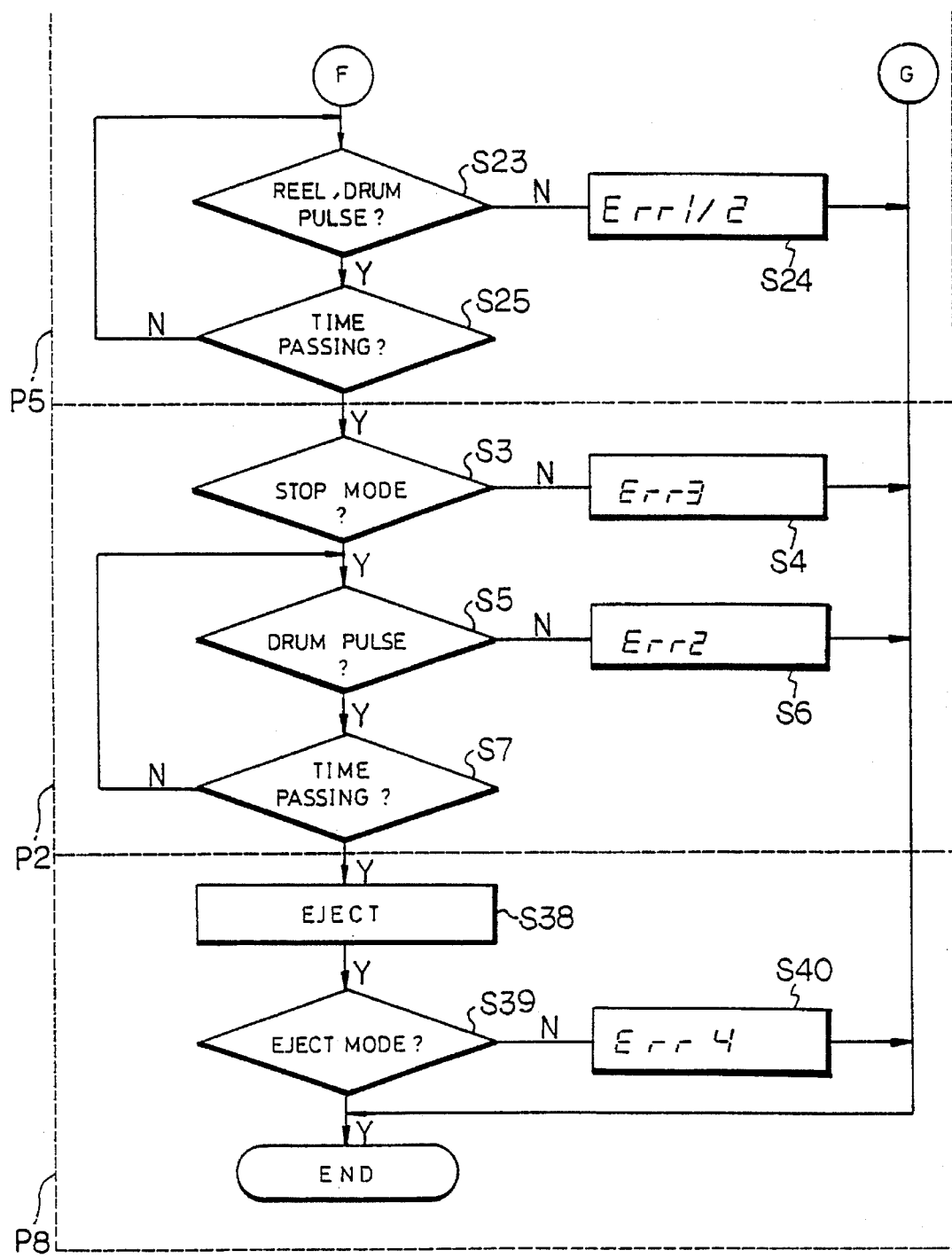

The VCR control circuit of the instant invention, shown in FIG. 3, which is similar to a conventional VCR control circuit (FIG. 1) is composed of a microprocessor MP for providing control signals according to the operation of each key of a key matrix K, a tuner TU connected to the microprocessor MP for selecting a channel number according to a control signal from the microprocessor MP, a deck part DE connected to the microprocessor MP for providing a sensor signal and a mode switch signal, a servo part SE connected to the microprocessor MP for controlling the speed and phase of a motor according to a control signal from the microprocessor MP, and a digitron DI connected to the microprocessor MP and the key matrix K for displaying the state of a VCR according to a control signal from the microprocessor MP.

However, the microprocessor MP of FIG. 3 decides the abnormality of the deck part DE by receiving a mode switch signal, a reel pulse, and a drum pulse from the deck part DE. That is, the deck part DE provides different reel pulses, drum pulses and mode switch signals according to each mode of VCR from a sensor part and then the microprocessor MP checks these pulses to decide whether the deck part DE is normally operated.

If the deck part DE is abnormally operated the microprocessor MP provides error data to the digitron DI to display the abnormal state of the deck part DE. At this time, the microprocessor MP decides the abnormal state of the deck part by checking the mode switch signal and the reel pulse in FF (Fast Forward) and REW(Rewind) modes and by checking the mode switch signal, the reel pulse, and the drum pulse in PLAY(Play), FPS(Forward Play Search), and RPS(Reverse Play Search) modes.

Also, the microprocessor MP decides the abnormal state of the deck part DE by checking the mode signal in EJECT mode and by checking the drum pulse and the mode switch in STOP mode.

The error data which is provided from the microprocessor MP to the digitron DI are different according to each mode of the VCR as follows:

| | |
|---|---|
| 1) REEL PULSE error | Err1 |
| 2) DRUM PULSE error | Err2 |
| 3) MODE error (EJECT → STOP) | Err3 |
| 4) MODE error (STOP → EJECT) | Err4 |
| 5) MODE error (STOP → FF/REW) | Err5 |
| 6) MODE error (FF/REN → STOP) | Err6 |
| 7) MODE error (STOP → PLAY) | Err7 |
| 8) MODE error (PLAY → STOP) | Err8 |
| 9) MODE error (PLAY/FPS → RPS) | Err9 |
| 10) MODE error (RPS → PLAY/EPS) | Err10 |

In the above, EJECT represents the operation of taking out the inserted tape from the deck, FF, REW, EPS, and RPS represent the fast forward operation, the rewind operation, the forward play search operation, and the reverse play search operation, respectively.

That is, the abnormal operation of the deck part DE due to the reel pulse or the drum pulse is displayed as Err1 or Err2, and when the deck part DE does not operate according to the corresponding mode of the present mode switch signal, one of Err3–Err10 is displayed.

In other words, the microprocessor MP provides the error data of the deck part DE according to the previous and present mode states of the VCR to the digitron DI and also provides the error data due to the abnormal operation of the reel pulse and the drum pulse to the same.

FIGS. 2(A)–2(D) are flow charts for checking the abnormal state of the VCR by using the conventional VCR control circuit according to the present invention.

The flow chart is composed of a mode decision process P1, a STOP mode decision process P2, a FF mode decision process P3, a REW mode decision process P4, a PLAY mode decision process P5, a FPS mode decision process P6, a RPS mode decision process P7, and an EJECT mode decision process P8. The processes P1~P8 are carried out sequentially or in a mixed manner.

To describe each process in detail, first, the mode decision process P1 is composed of a tape insertion decision step S1 for deciding whether a tape is inserted in the VCR and an automatic check mode decision step S2 for deciding whether the VTR is in the automatic check mode.

Next, the STOP mode decision process P2 is composed of a STOP mode decision step S3 for deciding whether the VTR is in the STOP mode by checking the mode switch signal, an error display step S4 for displaying the corresponding error when the VTR is not in the STOP mode, a drum pulse decision step S5 for deciding whether the drum pulse is normally provided according to the STOP mode, a drum pulse error display step S6 for providing an error data corresponding to the previous mode to the digitron DI, and a time decision step S7 for deciding whether a constant time is passed by.

The FF mode decision process P3 is composed of a FF step S8 for fast forwarding the video tape, a FF mode decision step S9 for deciding whether the VTR is in the FF mode, an error display step S10 for displaying the error data when the VTR is not in the FF mode, a reel pulse decision step S11 for deciding whether the reel pulse is normal in the FF mode, a reel pulse error display step S12 for displaying the error data when the reel pulse is not normal, and a time decision step S13 for deciding whether a constant time is passed by.

Similarly, the REW mode decision process P4 is composed of a REW step S14 for fast rewinding of the video tape, a REW mode decision step S15 for deciding whether the VTR is in the REW mode by checking the mode switch signal, an error display step S16 for displaying the error data when the VTR is not in the REW mode, a reel pulse decision step S17 for deciding whether the reel pulse is normal in the REW mode, a reel pulse error display step S18 for displaying the error data when the reel pulse is not normal, and a time decision step S19 for deciding whether a constant time is passed by.

The PLAY mode decision process P5 is composed of a play step S20 for playing the VTR, a PLAY mode decision step S21 for deciding whether the VTR in the PLAY mode by checking the mode switch signal, an error display step S22 for displaying the error data when the VTR is not in the PLAY mode, a reel and drum pulse decision step S23 for deciding whether the reel pulse and the drum pulse are normal in the PLAY mode, a reel and drum pulse error display step S24 for displaying the error data when the reel pulse or the drum pulse is not normal, and a time decision step 25 for deciding whether a constant time is passed by.

Similarly, the FPS mode decision process P6 is composed of a FPS step 26, a FPS mode decision step S27, an error display step S28, a reel and drum pulse decision step S29, a reel and drum pulse error display step S30, and a time decision step S31, and the RPS mode decision process P7 is carried out by a RPS step S32, a RPS mode decision step S33, an error display step S34, a reel and drum pulse decision step S35, a reel and drum pulse error display step S36, and a time decision step S37.

Finally, the EJECT mode decision process P8 is composed of a EJECT step S38 for ejecting the VTR, a EJECT mode decision step S39 for deciding whether the VTR in the EJECT mode, and an error display step S40 for displaying the error data when the VTR is not in the EJECT mode.

The method of checking the abnormal operations of the VTR is carried in a sequence of P1~P7.

Now the operation according to the present invention is described, referred to FIG. 2.

The microprocessor MP decides whether the tape is inserted in a tape insertion decision step S1, and if the tape is proven to be inserted, the microprocessor MP carries out an AUTO-CHECK mode decision step S2 and the microprocessor MP carries out the STOP mode decision process P2.

Subsequently, the microprocessor MP decides whether the VTR is in the STOP mode according to the user's STOP key operation on the key matrix K by checking the mode switch signal in the STOP mode decision step S3 and if not in the STOP mode, the microprocessor MP provides an error date Err3, as shown in Table 0.1, to the digitron DI in the error display step S4.

On the other hand, if the VCR is in the STOP mode, the microprocessor MP decides whether the drum pulse corresponds to the STOP mode in the drum pulse decision step S5 and if not, the microprocessor MP provides the drum pulse error date Err2 to the digitron DI in the drum pulse error display step S6.

On the other hand, if the drum pulse is normal corresponding to the STOP mode, the microprocessor MP carries out the time decision step S7 to carry out continuously the drum pulse decision step S5 during a constant time.

Next, the microprocessor MP carries out the FF mode decision process P3. When the VCR is fast forwarding in the FF step S8, the microprocessor MP decides whether the VTR is in the FF mode according to the user's FF key operation on the key matrix K by checking the mode switch signal in the FF mode decision step S9 and if not, the microprocessor MP provides the corresponding error data Err5 to the digitron DI in the mode error step S10.

On the other hand, if the VCR is in the FF mode according to the user's operation, the microprocessor MP decides whether the reel pulse corresponds to the FF mode in the reel pulse decision step S11 and if not, the microprocessor MP provides the corresponding error data Err1 to the digitron DI in the reel pulse error display step S12.

Also, if the reel pulse is normal corresponding to the FF mode, the microprocessor MP carries out the time decision step 13 to carry out continuously the reel pulse decision step S11 during a constant time.

Similar to the FF mode decision process P3, the REW mode decision process P4, the PLAY mode decision process P5, the FPS mode decision process P6, and the RPS mode decision process P7 are respectively carried out according to each mode operation of the VTR.

But, in the PLAY, FPS, RPS mode decision processes P5~P7, the drum pulse as well as the reel pulse are decided to be either normal or abnormal.

If the VCR is ejected while the microprocessor MP carries out such processes, the microprocessor MP decides whether the VCR is in the EJECT mode by checking the mode switch signal in the EJECT mode decision step S39 and if not, the microprocessor MP provides the corresponding error data to the digitron DI.

As previously mentioned, the present invention decides the mode conversion of the VCR by checking the mode switch signal and displays the mode error data in the abnormal mode conversion. Also, the present invention decides the operation state corresponding to each mode by using the reel pulse and the drum pulse and displays the error data if in an abnormal state, thereby informing the users whether the VCR is normal or not.

What is claimed is:

1. A video cassette recorder, comprising:

a microprocessor;

means for manually entering data into said microprocessor;

means for providing a reel pulse, a drum pulse and a mode switch signal to said microprocessor;

means for displaying a state of the video cassette recorder according to a control signal from said microprocessor;

wherein said microprocessor:
determines whether the video cassette recorder is operating, during a selected mode, according to said selected mode by checking the mode switch signal, the reel pulse, and the drum pulse; and
when the video cassette recorder is not operating according to said selected mode, transmits error data to the displaying means.

2. The video cassette recorder of claim 1, wherein said error data is indicative of at least one of:

a previous operating mode of the video cassette recorder;

a present operating mode of the video cassette recorder;

a reel pulse corresponding to a mode other than the mode selected; and a drum pulse corresponding to a mode other than the mode selected.

3. A method of checking the abnormal operation of a video cassette recorder, including a VCR drive circuit composed of a microprocessor for providing control signals, a check part for providing a reel pulse, a drum pulse, and a mode switch signal according to an operation mode, and a digitron for displaying information, said digitron controlled by said microprocessor, said method comprising:

an auto-check mode decision process for deciding whether said microprocessor is in auto-check mode;

a stop mode decision process for deciding whether said deck part is normally operated according to the stop mode by checking said mode switch signal and said drum pulse;

a fast forward mode and rewind mode decision process for deciding whether said deck part is normally operated according to the fast forward mode or the rewind mode by checking said mode switch signal and said reel pulse;

a play mode, a forward play search mode and reverse play search mode decision process for deciding whether said deck part is normally operated according to said play mode, said forward play search mode and said reverse play search mode by checking said mode switch signal, said reel pulse, and said drum pulse; and an eject mode decision process for deciding whether said deck part is normally operating according to the eject mode by checking said mode switch signal.

4. The method according to claim 3, wherein said auto-check mode decision process further comprises the steps of:

deciding whether a tape is inserted in the video cassette recorder; and deciding whether the video cassette recorder is in the automatic check mode.

5. The method according to claim 3, wherein the stop mode decision process further comprises the steps of:

deciding whether the video cassette recorder is in the stop mode by checking the mode switch signal;

displaying a corresponding error message when the video cassette recorder is not in the stop mode;

deciding whether the drum pulse is normally provided when in the stop mode;

displaying error data, corresponding to a mode previous to said stop mode, to the digitron when said drum pulse is not normally provided during said stop mode; and deciding whether a constant time has passed when said drum pulse is normally provided when in said stop mode.

6. The method according to claim 3, wherein the fast forward mode decision process further comprises the steps of:

moving a video tape forward at a fast rate;

determining whether the video cassette recorder is in the fast forward mode;

displaying first error data when the video cassette recorder is not in the fast forward mode;

determining whether the reel pulse is normal in the fast forward mode;

displaying second error data when the reel pulse is not normal; and determining whether a constant time has passed when the reel pulse is normal.

7. The method according to claim 3, wherein the rewind mode decision process further comprises the steps of:

rewinding a video tape at a fast rate;

deciding whether the video cassette recorder is in the rewind mode by checking the mode switch signal;

displaying first error data when the video cassette recorder is not in the rewind mode;

deciding whether the reel pulse is normal in the rewind mode;

displaying second error data when the reel pulse is not normal; and deciding whether a constant time has passed when the reel pulse is normal.

8. The method according to claim 3, wherein the play mode decision process further comprises the steps of:

playing a video tape in the video cassette recorder during the play mode;

deciding whether the video cassette recorder is in the play mode by checking the mode switch signal;

displaying first error data when the when the mode switch signal is not indicative of the play mode;

deciding whether the reel pulse and the drum pulse are normal in the play mode;

displaying second or third error data when the reel pulse or the drum pulse is not normal; and deciding whether a constant time has passed when the reel pulse and the drum pulse are normal.

9. The method according to claim 3, wherein the forward play search mode decision process further comprises the steps of:

playing the video cassette recorder;

deciding whether the video cassette recorder is in the forward play search mode by checking the mode switch signal;

displaying first error data when the mode switch signal indicates the video cassette recorder is not in the forward play search mode;

deciding whether the reel pulse and the drum pulse are normal in the forward play search mode;

displaying second error data when either the reel pulse or the drum pulse is not normal; and deciding whether a constant time has passed when said reel and drum pulses are normal.

10. The method according to claim 3, wherein the reverse play search mode decision process further comprises the steps of:

playing the video cassette recorder;

deciding whether the video cassette recorder is in the reverse play search mode by checking the mode switch signal;

displaying first error data when the mode signal indicates the video cassette recorder is not in the reverse play search mode;

deciding whether the reel pulse and the drum pulse are normal in the reverse play search mode;

displaying second or third error data when either the reel pulse or the drum pulse is not normal, respectively; and deciding whether a constant time has passed when the reel and drum pulses are normal.

11. The method according to claim 3, wherein the eject mode decision process further comprises the steps of:

ejecting a video cassette from the video cassette recorder;

deciding whether the video cassette recorder is in the eject mode; and displaying error data, when the video cassette recorder is not in the eject mode, on the digitron.

12. A process for determining whether a video cassette recorder is operating according to a selected mode, said process comprising the steps of:

determining whether a video tape is inserted in a deck part of the video cassette recorder;

determining whether the video cassette recorder is in an automatic check mode when it is determined that the video tape is inserted;

determining whether the video cassette recorder is in a stop mode by checking a mode switch signal;

displaying a corresponding error message when the mode switch signal indicates the video cassette recorder is not in the stop mode;

determining whether a drum pulse corresponding to the stop mode is normally provided from the deck part when the mode switch signal indicates the video cassette recorder is in the stop mode;

displaying a corresponding error message when the drum pulse is not normally provided as determined by said drum pulse determining step;

determining whether a first constant time has passed when the drum pulse is normally provided as determined by said drum pulse determining step; and continuing to determine whether the drum pulse is normally provided during the stop mode, until the first constant time has passed.

13. The process of claim 12, further comprising the steps of:

advancing the video tape at an accelerated speed after said first constant time period has passed;

determining whether the video cassette recorder is in a fast forward mode by checking the mode switch signal;

displaying a corresponding error message when the mode switch signal indicates the video cassette recorder is not in the fast forward mode;

determining whether a reel pulse is normally provided from the deck part during to the fast forward mode when mode switch signal indicates the video cassette recorder is in the fast forward mode;

displaying a corresponding error message during said fast forward mode when the reel pulse is not normally provided as determined by said reel pulse determining step;

determining whether a second constant time has passed when the reel pulse is normally provided during the fast forward mode,; and continuing to determine whether the reel pulse is normally provided during the fast forward mode, until the second constant time has passed.

14. The process of claim 13, further comprising the steps of:

rewinding the video tape at an accelerated speed after said second constant time has passed;

determining whether the video cassette recorder is in a rewind mode by checking the mode switch signal;

displaying a corresponding error message, during said rewinding of said video tape, when the mode switch signal indicates the video cassette recorder is not in the rewind mode;

determining whether a reel pulse is normally provided from the deck part during to the rewind mode when the mode switch signal indicates the video cassette recorder is in the rewind mode;

displaying a corresponding error message when the reel pulse is not normally provided during said rewind mode;

determining whether a third constant time has passed when the reel pulse is normally provided during the rewind mode; and continuing to determine whether the reel pulse is provided during the rewind mode, until the third constant time has passed.

15. The process of claim 14, further comprising the steps of:

determining, after said third constant time has passed, whether the video cassette recorder is in a second stop mode by checking said mode switch signal;

displaying a corresponding error message when the mode switch signal indicates the video cassette recorder is not in the second stop mode;

determining whether a drum pulse is normally provided from the deck part when the video cassette recorder is in the second stop mode;

displaying a corresponding error message when the drum pulse is not normally provided as determined by said drum pulse determining step during said second stop mode;

determining whether a fourth constant time has passed when the drum pulse is normally provided as determined by said drum pulse determining step during said second stop mode; and continuing to determine whether the drum pulse is normally provided, until the fourth constant time has passed.

16. The process of claim 15, further comprising the steps of:

playing the video tape after said fourth constant time has passed;

determining whether the video cassette recorder is in a play mode, during said playing step, by checking the mode switch signal;

displaying a corresponding error message when the mode switch signal indicates the video cassette recorder is not in the play mode;

determining whether a reel pulse and a drum pulse are normally provided from the deck part when the mode switch signal indicates the video cassette recorder is in the play mode;

displaying, respectfully, a fourth corresponding error message or a fifth corresponding error message when the reel pulse or the drum pulse is not normally provided during the play mode;

determining whether a fifth constant time has passed when the reel pulse and the drum pulse are normally provided during the play mode; and continuing to determine whether the reel pulse and the drum pulse are normally provided during the play mode, until the fifth constant time has passed.

17. The process of claim 16, further comprising the steps of:

playing and searching the video tape in a forward direction after said fifth constant time has passed;

determining whether the video cassette recorder is in a forward play search mode by checking the mode switch signal during said playing and searching step;

displaying a corresponding error message when the mode switch signal indicates the video cassette recorder is not in the forward play search mode;

determining whether a reel pulse and a drum pulse are normally provided from the deck part when the mode switch signal indicates the video cassette recorder is in the forward play search mode;

respectfully displaying a corresponding error message when said reel pulse or said drum pulse is not normally provided during said forward play search mode;

determining whether a sixth constant time has passed when said reel pulse or said drum pulse is normally provided during said forward play search mode; and continuing to determine whether the reel pulse and the drum pulse are normally provided during the forward play search mode, until the sixth constant time has passed.

18. The process of claim 17, further comprising the steps of:

playing and searching the video tape while rewinding the video tape after said sixth constant time has passed;

determining whether the video cassette recorder is in a reverse play search mode by checking the mode switch signal during said playing and searching the video tape while rewinding step;

displaying a corresponding error message when the mode switch signal indicates the video cassette recorder is not in said reverse play search mode;

determining whether a reel pulse and a drum pulse are normally provided from the deck part when said mode switch signal indicates said video cassette recorder is in the reverse play search mode;

respectfully displaying a corresponding error message when said reel pulse or said drum pulse is not normally provided during said reverse play search mode;

determining whether a seventh constant time has passed when said reel pulse and said drum pulse are normally provided during said reverse play search mode; and continuing to determine whether the reel pulse and the drum pulse are normally provided during the reverse play search mode, until the seventh constant time has passed.

19. The process of claim 18, further comprising the steps of:

playing the video tape after said seventh constant time has passed;

determining whether the video cassette recorder is in a second play mode, during said playing step, by checking the mode switch signal;

displaying a corresponding error message when the mode switch signal indicates the video cassette recorder is not in the second play mode;

determining whether a reel pulse and a drum pulse are normally provided from the deck part when the mode switch signal indicates the video cassette recorder is in the second play mode;

respectfully displaying a corresponding error message when the reel pulse or the drum pulse is not normally provided during the second play mode;

determining whether a eighth constant time has passed when the reel pulse and the drum pulse are normally provided during the second play mode; and continuing to determine whether the reel pulse and the drum pulse are normally provided during the play mode, until the eighth constant time has passed.

20. The process of claim 19, further comprising the steps of:

determining, after said eighth constant time has passed, whether the video cassette recorder is in a third stop mode by checking said mode switch signal;

displaying a corresponding error message when the mode switch signal indicates the video cassette recorder is not in the third stop mode;

determining whether a drum pulse is normally provided from the deck part when the video cassette recorder is in the third stop mode;

displaying a corresponding error message when the drum pulse is not normally provided as determined by said drum pulse determining step during said third stop mode;

determining whether a ninth constant time has passed when the drum pulse is normally provided as determined by said drum pulse determining step during said third stop mode; and continuing to determine whether the drum pulse is normally provided, until the ninth constant time has passed.

21. The process of claim 20, further comprising the steps of:

ejecting the video tape after said ninth constant time has passed;

determining whether the video cassette recorder is in an eject mode by checking the mode switch signal during said ejecting step; and displaying a corresponding error message when said mode switch signal indicates said video cassette recorder is not in said eject mode.

* * * * *